H. H. JESSEN.
WEIGHING AND RECORDING DEVICE.
APPLICATION FILED DEC. 4, 1917.
1,305,546.
Patented June 3, 1919.
4 SHEETS—SHEET 1.
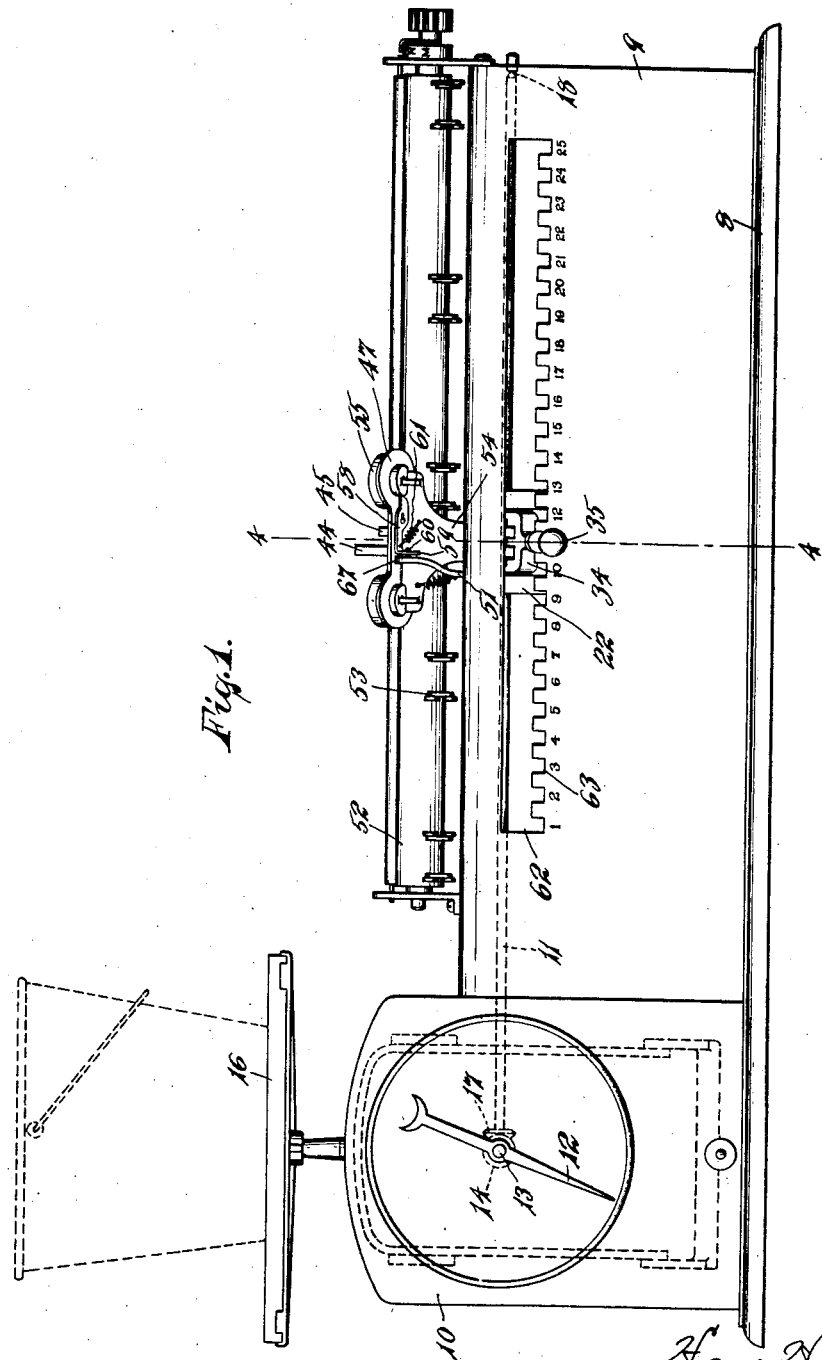
INVENTOR.
Hans H. Jessen,
BY
Arthur Jenkins,
ATTORNEY.

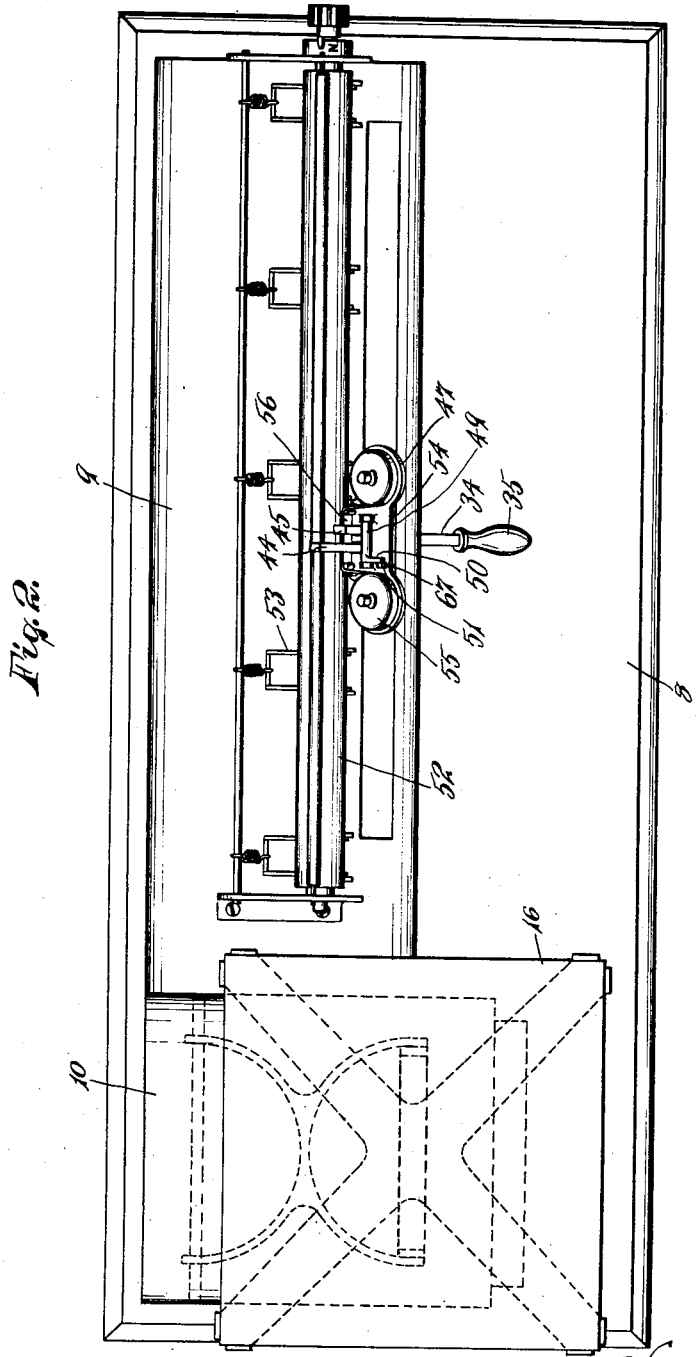

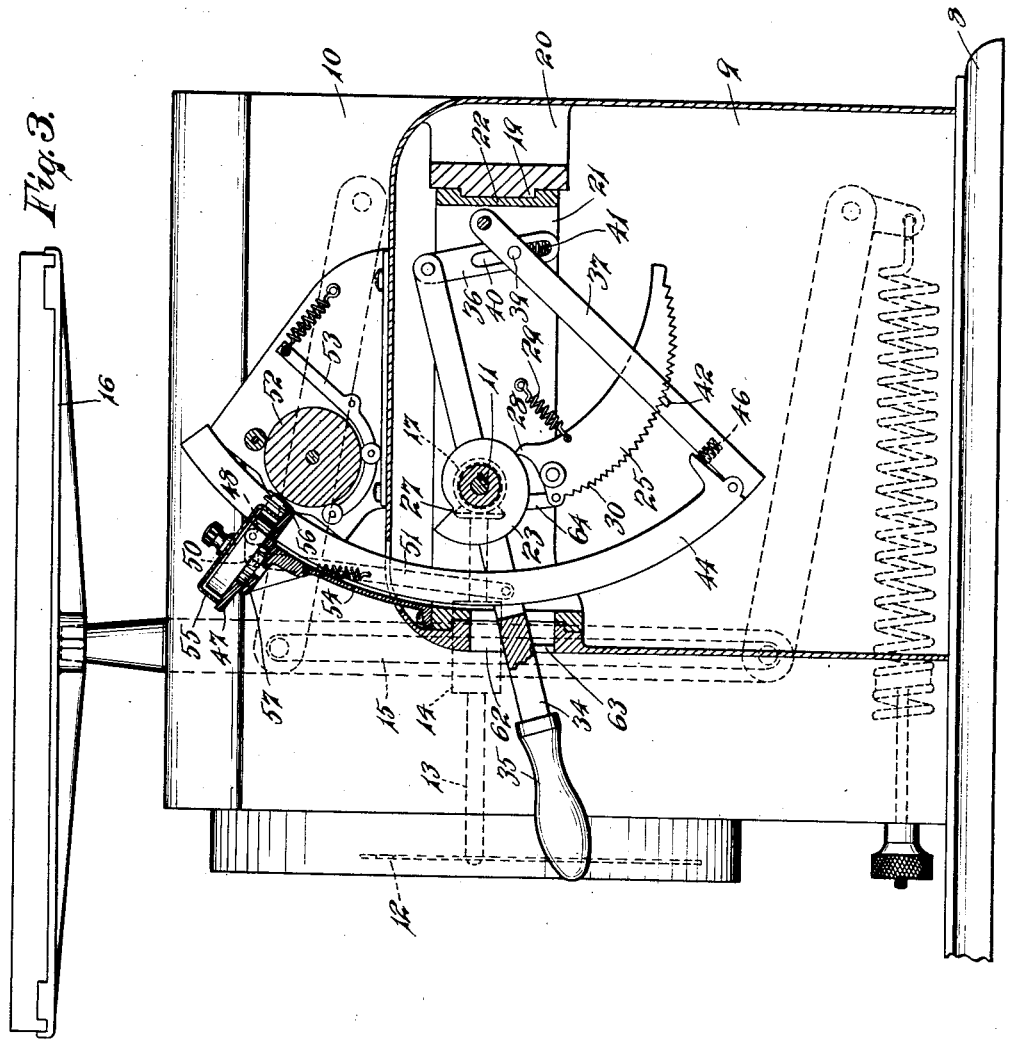

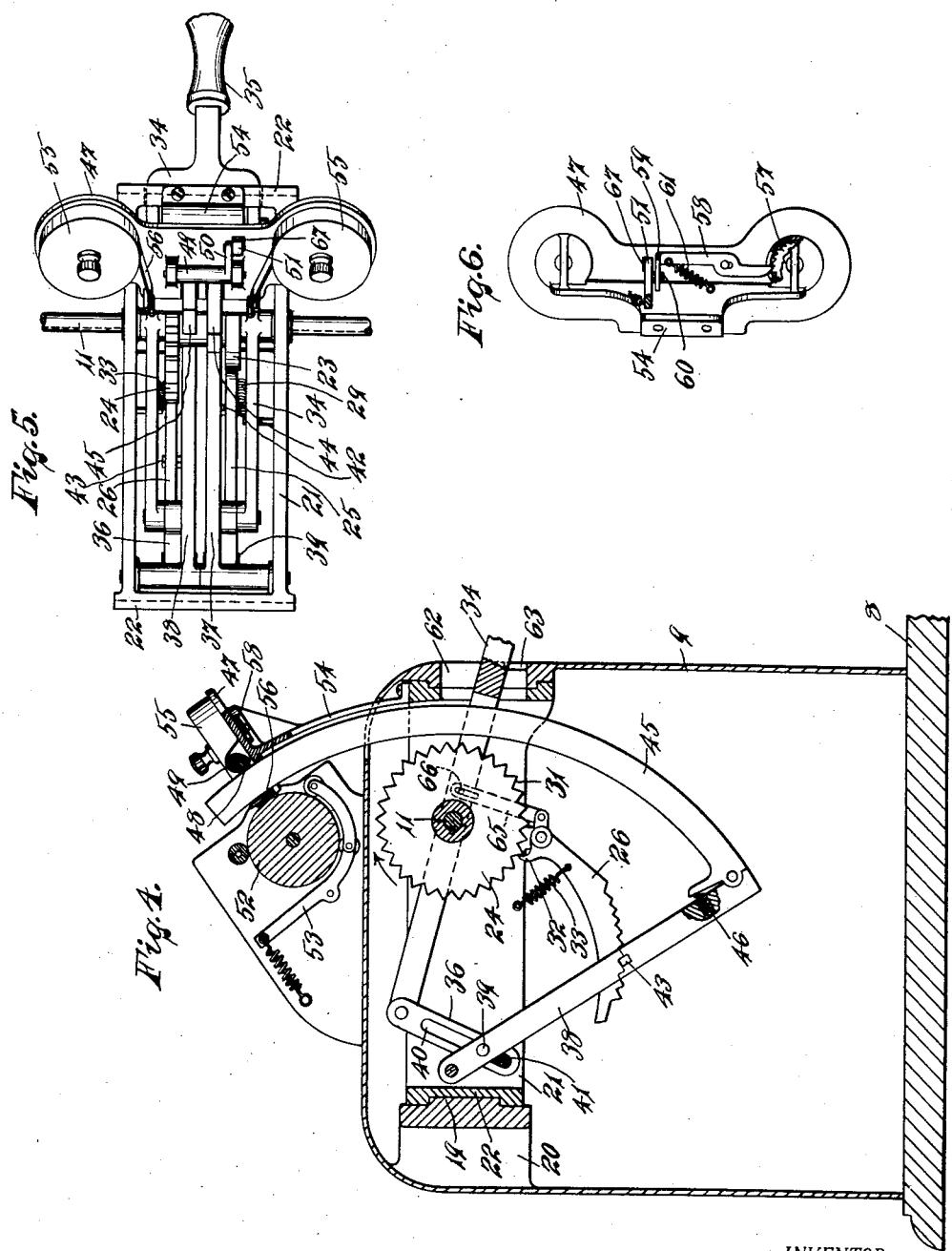

UNITED STATES PATENT OFFICE.

HANS H. JESSEN, OF EAST HARTFORD, CONNECTICUT, ASSIGNOR OF TWO-THIRDS TO JONATHAN C. BIGELOW, OF BURNSIDE, CONNECTICUT.

WEIGHING AND RECORDING DEVICE.

1,305,546.  Specification of Letters Patent.  Patented June 3, 1919.

Application filed December 4, 1917. Serial No. 205,397.

*To all whom it may concern:*

Be it known that I, HANS H. JESSEN, a citizen of the United States, residing at East Hartford, in the county of Hartford and State of Connecticut, have invented a new and Improved Weighing and Recording Device, of which the following is a specification.

My invention relates to the class of devices that are used for the purpose of obtaining correct records of weight, the mechanism herein shown and described being especially applicable in obtaining a record of the weight of milk, and an object of my invention, among others, is to provide a device of this class that shall be simple in construction and particularly efficient in obtaining an accurate record of weight.

One form of device embodying my invention and in the construction and use of which the objects herein set out, as well as others, may be attained, is illustrated in the accompanying drawings, in which—

Figure 1 is a view in front elevation of my improved weighing apparatus.

Fig. 2 is a top plan view of the same.

Fig. 3 is a view in cross section (scale enlarged) looking from the end of the device that is at the right in Figs. 1 and 2.

Fig. 4 is a view in cross section on plane denoted by dotted line 4—4 of Fig. 1 and looking from the left.

The actuating lever in the first four figures is in a position just prior to the time of registering a weight.

Fig. 5 is a detail view, scale enlarged, illustrating the carrier and parts mounted thereon.

Fig. 6 is a detail view, scale enlarged, of the ribbon spool supporting plate.

In the accompanying drawings the numeral 8 indicates the base of my improved apparatus supporting a case 9 that may be of any suitable shape and of any desired material to inclose portions of the mechanism. A weighing device 10, of any suitable construction, is located at one end of, or within, the case 9, and in carrying my invention into effect I provide a connection between the weighing device and an operating shaft 11 extending within the case 9 and by means of which said shaft may be rotated.

Briefly stated the weighing device comprises an indicator pointer 12 secured to a spindle 13 having a pinion 14 meshing with a rack 15 rigidly connected with and to be reciprocated by a platform 16 in a manner common to small platform scales, which operation will be readily understood and for which reason further description is deemed unnecessary herein.

A bevel pinion secured to the spindle 13 meshes with a bevel gear 17 secured to the shaft 11, these parts comprising the connection for operating said shaft. The operating shaft 11 may be mounted in the frame or case in any suitable manner and it preferably extends from one end to the other of the case, a "point" bearing 18 being shown herein as a means for supporting the end of the shaft most distant from the weighing device.

A carrier is mounted for sliding movement endwise of the case on slideways 19 supported on brackets 20 projecting from the inner wall of the case. The carrier is in the form of a frame composed of side parts 21 and end pieces 22, the latter having grooves within which guide ribs comprising portions of the slideway are received. The shaft 11 extends through the side parts of the carrier frame, the latter being free to slide upon said shaft. Detent positioning members 23—24 are supported on the shaft 11 between the side parts 21 of the carrier frame, these members serving to position detents 25—26. The members 23 and 25 position the parts to register a certain unit of weight, and the parts 24 and 26 position other parts for registry of fractions of said weight. For instance, in the machine as arranged herein the members 23 and 25 position the parts for the registry of pounds and the parts 24 and 26 position the machine for the registry of tenths of pounds.

In the construction of the parts as herein shown the member 23 is in the form of a cam in which the radius gradually increases from the zero point denoted by the numeral 27. The detent 25 is pivotally supported on one of the side parts 21 and has a finger 28 resting in contact with said cam as through the force of a spring 29. The detent is also provided with stops 30 in the form of a succession of shoulders that operate to position a member to be hereinafter described. The member 24 has a number of detent positioning surfaces 31, all of the same construction and operating in the same manner to position the detent 26 that has a finger 32 that is pressed into contact with said surfaces as by means of a spring 33. This detent 26 is pivotally mounted on one of the side parts of the carrier, as hereinbefore described with respect to the detent 25. An actuating lever 34 is fulcrumed upon the shaft 11, this lever comprising two branches, as shown in Fig. 5 of the drawings, and a single shank containing an operating handle 35. The end of the lever opposite the handle is connected as by means of links 36 with type segment bars 37—38 pivotally mounted on the side parts 21 of the frame. In the preferred form of connection between the actuating lever and each of said bars, a pin 39 on each bar projects into a slot 40 in each link and a spring 41 secured to the link and to said pin provides a yielding connection between said links and each of the bars 37 and 38. Lugs 42—43 project from each of said bars in position to strike the stop shoulders on the detents 25 and 26, the shoulders against which said lugs will strike being determined by the position of the detent, and such position of the detent being determined by the amount of weight upon the platform 16 of the scales.

During the movement of the detents 25 and 26 it is desirable that the fingers 28 and 32 shall be out of contact with the positioning members and to this end connections are made between each of said detents and the actuating lever 34. These connections consist of detent releasing bars 64—65 pivotally connected with the detents as shown in Figs. 3 and 4 of the drawings, each bar having a slot to receive a pin 66, as clearly shown in dotted lines in Fig. 4 of the drawings. The lever 34 is shown in the drawings herein as in an intermediate position and just before the final movement to press the type segments against a sheet of paper on the platen. When the lever 34 is in its upper position the pins 66 will engage the upper ends of the slots in the bars 64—65, and the detents 25—26 will thus be positioned so that the fingers 28 and 32 will not be in contact with the positioning members 23 and 24.

Type segments or recorders 44—45 are pivotally supported by the bars 37—38 respectively, said segments having a limited pivotal movement on the bars and springs 46 or equivalent means being employed to hold the segments in predetermined positions.

A presser lever is pivotally mounted upon the carrier, in the construction herein shown this lever being mounted upon a spool supporting plate 47 and the lever consists of a presser lug 48 projecting from a shaft 49 mounted in bearings on said plate and having an arm 50 pivotally attached to a presser bar 51 that projects through a hole 67 in said spool supporting plate, the other end of said bar being pivotally attached to the actuating lever 34.

A platen roller 52 is mounted on top of the case 9, extending from end to end of said case, said roller being positioned in coöperative relation with the inner or type bearing edge of the segments or recorders 44 and 45. Paper supports 53 are located at proper intervals along the roller as a means of holding sheets of paper in place on the platen. This platen roller and said supports may be of any desired form and construction so that further and detailed description is, therefore, omitted herein.

The spool supporting plate 47 is located at the upper end of a spool supporting bracket 54 that is secured to the carrier and rises therefrom to support ribbon spools 55 in position to supply an inking ribbon 56 across the back or printing edges of the segments or recorders 44 and 45, said ribbon passing between the segments and the platen 52. These ribbon spools may be of any desired form and construction and any means for feeding the ribbon may be employed, the structure herein shown comprising a ratchet wheel 57 on the shaft of one of the spools operated by a pawl 58 pivotally mounted underneath the plate 47. A cam plate 59 secured to the pawl and operated by a pin 60 projecting from the presser bar 51 moves the pawl to disengage it from the teeth of the ratchet wheel and a spring 61 acts to move the pawl into engagement with the ratchet teeth.

The actuating lever 34 extends through an opening 62 in the front of the case, one edge of this opening having notches 63 to receive said lever. This positioning of the lever, and consequently of the carrier, enables a record to be made in a predetermined place on a sheet on the platen, and this is of especial advantage when the machine is employed for weighing milk, the present machine being especially designed for this purpose, as it enables separate records to be made in predetermined columns of the weight of the milk of different cows, numbers or other characters being placed opposite the notches, each to denote a certain cow.

In the operation of the device a receptacle containing milk or other matter having been placed on the platform 16, and consequently moved downwardly, the downward movement of the rack 15, caused by the movement of the platform, will rotate the shaft 11, to a point determined by the position of the platform when it reaches its lowermost position under the force of the weight upon it. This turning of the shaft to a certain degree rotatably places the members 23 and 24 in definite positions with respect to the platform and consequently the detents 25 and 26 are placed in like definite positions.

The handle 35 being now pushed downwardly, the rear end of the lever 34 is raised, swinging the type segment bars 37 and 38 upwardly carrying with them the type segments. Said bars move upwardly until the lugs 42—43 each come in contact with a certain shoulder determined by the position of the detents 25 and 26, the position of said detents being determined by the amount of weight upon the platform 16. The bars 37 and 38 are thus held from further upward movement, but the lever 34 is permitted further swinging movement owing to the spring connections 46 between said bar and the bars 37 and 38.

The movement of the lever 34 thus far described has, through the medium of the presser bar 51, swung the presser lugs 48 toward the type segment bars, and the continued movement of the lever presses the segments against the ribbon and the latter against the sheet of paper on the platen roller 52, and an impression will be made upon the sheet of paper determined by the position of the segments controlled by their connections with the platform 16 as hereinbefore described, and in making this impression the carriage may be positioned at any point along the platen and sheet of paper thereon that may be desired. It will be noted that at the beginning of the movement of the lever 34 the pins 66 being moved downwardly release the bars 64 and 65 and permit the springs 29 and 33 to effect engagement of the fingers 28 and 32 with the members 23 and 24, after which further movement of the lever 34 is permitted by reason of the pin and slot connection hereinbefore described.

As hereinbefore stated the movable carriage allows impressions to be made on a sheet of paper at different points along the length of the platen, whereby a record of the milk from different cows may be obtained, and the sheets of paper may be divided into columns, each bearing appropriate characters designating a certain cow, and likewise separate records of the morning and evening milking of each cow may be readily obtained, the rotatable platen allowing such records to be placed in two horizontal lines such as may be designated by the letters M—N (morning—night) as illustrated in the drawings.

In accordance with the provisions of the patent statutes, I have described the principles of operation of my invention, together with the apparatus which I now consider to represent the best embodiment thereof; but I desire to have it understood that the apparatus shown is only illustrative and that the invention may be carried out by other means.

I claim—

1. A register including a device concerning which a record is to be made, a positioning member operatively connected with a movable member of said device and having an unbroken inclined positioning surface, a recorder, a connection between the recorder and positioning member and including a member in continuous engagement with the positioning member to locate the recorder in recording position, and means for operating the recorder to make a record.

2. A register including a device concerning which a record is to be made, a plurality of positioning members operatively connected with a movable part of said device, each of said members having unbroken inclined positioning surfaces, a recorder operatively connected with each positioning member, a connection between each recorder and its positioning member and including a member in continuous engagement with said positioning member to locate the recorder in recording position, and means for operating the recorder to make a record.

3. A register including a device concerning which a record is to be made, a positioning member operatively connected with a movable member of the weighing device and having a positioning surface, a detent to be positioned by said surface, a recorder movably mounted independently of said detent to be positioned in different positions thereby, and means for operating the recorder to make a record.

4. A register including a device concerning which a record is to be made, a positioning member operatively connected with a movable member of said device, a detent movably mounted to be positioned by said positioning member and having a plurality of stop shoulders, a recorder movably mounted to be positioned by the stop shoulders on said detent, and means for operating the recorder to make a record.

5. A register including a device concerning which a record is to be made, a plurality of positioning members operatively connected with a movable member of said device, each of said members having a positioning surface, a detent movably mounted to engage the positioning surface on each positioning member, each detent having a series of stop shoulders, recorders movably mounted each to be positioned by the stop shoulders on a detent, and means for operating the recorders to make a record.

6. A register including a device concerning which a record is to be made, a plurality of positioning members operatively connected with a movable member of said device, each of said members having a positioning surface, a plurality of detents each movably mounted to engage a positioning surface on one of said members, said detents each having stop shoulders, a plurality of recorders movably mounted to be positioned by said stop shoulders, and means for simultaneously operating a plurality of said recorders to make a record.

7. A register including a device concerning which a record is to be made, a plurality of positioning members operatively connected with a movable member of said device, each of said members having an inclined positioning surface, a plurality of detents movably mounted, each to engage one of said surfaces, each detent having a series of stop shoulders, recorders movably mounted to be positioned in various positions by the stop shoulders on the detents, and means for operating the recorder to make a record.

8. A register including a device concerning which a record is to be made, a positioning member operatively connected to be rotated by a movable member of said device, said positioning member having a continuous, unbroken positioning surface inclined with respect to the radius of said member, a recorder operatively connected to be positioned in various positions by said inclined positioning surface, and means for operating the recorder to make a record.

9. A register including a device concerning which a record is to be made, a positioning member operatively connected to be rotated by a movable member of said device, said positioning member having a continuous, unbroken positioning surface inclined with respect to the radius of said member, a detent movably mounted to be positioned by said positioning surface, a recorder operatively connected with said detent to be located in different positions thereby, and means for operating the recorder to make a record.

10. A register including a device concerning which a record is to be made, a plurality of positioning members, each operatively connected to be operated by a movable member of said device, each of said members having a continuous, unbroken positioning surface inclined with respect to the radius of its member, a recorder operatively connected with each of said positioning members to be positioned by said inclined surfaces, and means for operating the recorders to make a record.

11. A register including a device concerning which a record is to be made, a plurality of positioning members each operatively connected to be rotated by a movable member of said device, each of said members having a continuous, unbroken positioning surface inclined with respect to the radius of said member, a plurality of detents each movably mounted to be positioned by the positioning surface on one of said members, a recorder operatively connected to be positioned by one of said detents, and means for operating the recorders to make a record.

12. A register including a device concerning which a record is to be made, a plurality of positioning members operatively connected to be rotated by a movable member of said device, each of said members having a continuous, unbroken surface inclined with respect to the radius of said member and the surface upon each member being differently formed from that upon another member, a plurality of recorders each operatively connected to be positioned by one of said positioning surfaces, and means for operating the recorder to make a record.

13. A register including a device concerning which a record is to be made, a plurality of positioning members each operatively connected to be rotated by a movable member of said device, each member having a continuous, unbroken positioning surface inclined with respect to the radius of said member, each of said inclined surfaces being of different formation from that upon another member, a plurality of detents each movably mounted to be positioned by one of said inclined surfaces, a plurality of recorders each operatively connected to be positioned by one of said detents, and means for operating the recorders to make a record.

14. A register including a device concerning which a record is to be made, a positioning member operatively connected to be rotated by a movable member of said device, said member having a continuous, unbroken positioning surface of spiral form, a recorder operatively connected with said positioning member to be positioned in various positions by said positioning surface, and means for operating the recorder.

15. A register including a device concerning which a record is to be made, a positioning member operatively connected to be rotated by a movable member of said device, said positioning member having a spirally arranged positioning surface, a detent in engagement with said positioning surface to be positioned thereby, a recorder operatively connected with the detent to be positioned in different positions by said detent, and means for operating the recorder to make a record.

16. A register including a device concerning which a record is to be made, a positioning member operatively connected to be rotated by a movable member of said device and having a straight positioning surface inclined with respect to the radius of said member, a recorder operatively connected with said member to be positioned by said surface, and means for operating the recorder to make a record.

17. A register including a device concerning which a record is to be made, a plurality of positioning members operatively connected to be rotated by a movable member of said device, one of said members having a spirally arranged positioning surface and the other having a straight positioning surface, the latter inclined to the radius of its member, a plurality of recorders each operatively connected to be positioned by one of said positioning surfaces, and means for operating the recorders to make a record.

18. A register including a device concerning which a record is to be made, a plurality of positioning members operatively connected to be rotated by a movable member of said device, one of said members having a spirally arranged positioning surface and the other having a plurality of positioning surfaces of similar formation, and a plurality of recorders, one connected to be positioned by the positioning surface of spiral formation and the other to be positioned by either of the other positioning surfaces, and means for operating the recorder to make a record.

19. A register including a device concerning which a record is to be made, a positioning member operatively connected to be operated by a movable member of said device, a pivotally mounted recorder supporting bar, means for moving said bar into position determined by said positioning member, a recorder projecting from said bar, and means for operating the recorder to make a record.

20. A register including a device concerning which a record is to be made, a positioning member operatively connected to be operated by a movable member of said device, a pivotally mounted recorder supporting bar, means for moving said bar into position determined by said positioning member, a recorder yieldingly connected with said bar, and means for operating the recorder to make a record.

21. A register including a device concerning which a record is to be made, a positioning member operatively connected to be operated by a movable member of said device, a pivotally mounted recorder supporting bar, means for moving said bar into position determined by said positioning member, a recorder pivotally attached to said supporting bar, means for yieldingly holding the recorder in one position on said bar, means for moving said bar to position the recorder, and means for operating the recorder to make a record.

22. A register including a device concerning which a record is to be made, a positioning member operatively connected with a movable member of said device, an arc shaped recorder movably mounted to be positioned by said positioning device, said recorder having an impression surface on one side, and means to contact with the opposite side of the recorder to impart recording movement thereto.

23. A register including a device concerning which a record is to be made, a positioning member operatively connected to be operated by a movable member of said device, a detent to be operated by said positioning member, a recorder movably mounted to be positioned by said detent, a lever mounted to operate said recorder, and a connection between said lever and detent to move the latter from engagement with said positioning member.

24. A register including a device concerning which a record is to be made, a positioning member operatively connected with a movable member of said device, a detent operatively connected with said positioning member, a recorder movably mounted to be positioned by said detent, a lever operatively connected to move said recorder, a recording member to impart recording movement to the recorder, a connection between said lever and recording member, and a connection between said lever and detent to move the latter from engagement with said positioning member.

25. A register including a device concerning which a record is to be made, a carrier movably mounted with respect to said device, a recorder movably mounted on said carrier, positioning mechanism entirely and movably mounted on the carrier and operatively connected with a movable member of said device, and means mounted on said carrier and operatively connected with the recorder to actuate it.

26. A register including a device concerning which a record is to be made, a carrier movably mounted with respect to said device, a plurality of positioning wheels rotatably mounted on the carrier, connections between said wheels and a movable member of said device, a plurality of recorders appurtenant to each of said wheels and movably mounted on the carrier, means mounted upon the carrier and connected with said recorders to move them into contact with said wheels, and means for imparting recording movement to the recorders.

27. A register including a device concerning which a record is to be made, a carrier movably mounted with respect to said device, a plurality of positioning wheels rotatably mounted on the carrier, each of said wheels having a positioning formation different from that upon another wheel, a recorder appurtenant to each wheel and movably mounted upon the carrier, an actuating member movably mounted upon the carrier to move said recorders into recording position, and means for effecting recording movement of said recorders.

28. A register including a device concerning which a record is to be made, a carrier movably mounted with respect to said device, a positioning member rotatably mounted upon the carrier, a detent movably mounted on the carrier to engage said positioning member, a recorder movably mounted on the carrier to be positioned by said detent, an actuating member pivotally mounted on the carrier and operatively connected with the recorder, and means for imparting recording movement to said recorder.

29. A register including a device concerning which a record is to be made, a carrier movably mounted with respect to said device, a platen stationary with respect to said carrier, a positioning member rotatably mounted on the carrier, a recorder movably mounted on the carrier to be positioned by said positioning member, an actuating member movably mounted on the carrier and operatively connected with the recorder, and means for effecting recording movement of the recorder.

HANS H. JESSEN.